US009010122B2

(12) United States Patent
Bangerter et al.

(10) Patent No.: US 9,010,122 B2
(45) Date of Patent: Apr. 21, 2015

(54) TURBINE ENGINE COMBUSTOR AND STATOR VANE ASSEMBLY

(75) Inventors: James P. Bangerter, Manchester, CT (US); Dennis J. Duhamel, Oakdale, CT (US); Robert M. Sonntag, Bolton, CT (US); Reza Rezvani, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 264 days.

(21) Appl. No.: 13/560,622

(22) Filed: Jul. 27, 2012

(65) Prior Publication Data

US 2014/0030064 A1 Jan. 30, 2014

(51) Int. Cl.

| | |
|---|---|
| ***F02C 1/00*** | (2006.01) |
| ***F02G 3/00*** | (2006.01) |
| ***F01D 9/02*** | (2006.01) |
| ***F23R 3/00*** | (2006.01) |
| ***F23R 3/06*** | (2006.01) |
| ***F23R 3/50*** | (2006.01) |

(52) U.S. Cl.

CPC .......... *F01D 9/023* (2013.01); *F05D 2260/202* (2013.01); *F23R 3/002* (2013.01); *F23R 3/06* (2013.01); *F23R 3/50* (2013.01); *F23R 2900/00012* (2013.01); *F23R 2900/03041* (2013.01); *F23R 2900/03042* (2013.01); *F23R 2900/03044* (2013.01)

(58) Field of Classification Search

CPC .............. F23R 3/002; F23R 3/06; F23R 3/02; F23R 3/26; Y02T 50/675; F05B 2260/202; F05B 2260/201

USPC .................................... 60/752–760, 796, 800

See application file for complete search history.

(56) References Cited

U.S. PATENT DOCUMENTS

| | | | | |
|---|---|---|---|---|
| 4,695,247 | A | 9/1987 | Enzaki et al. | |
| 5,435,139 | A | 7/1995 | Pidcock et al. | |
| 6,101,814 | A | 8/2000 | Hoke et al. | |
| 6,199,371 | B1 | 3/2001 | Brewer et al. | |
| 6,606,861 | B2 | 8/2003 | Snyder | |
| 7,093,439 | B2 | 8/2006 | Pacheco-Tougas et al. | |
| 7,219,498 | B2 | 5/2007 | Hadder | |
| 7,413,808 | B2 | 8/2008 | Burd et al. | |
| 8,216,687 | B2 | 7/2012 | Burd et al. | |
| 2003/0213250 | A1 * | 11/2003 | Pacheco-Tougas et al. | 60/752 |
| 2009/0235666 | A1 | 9/2009 | Tuttle et al. | |
| 2010/0211111 | A1 | 8/2010 | Sonntag et al. | |
| 2010/0303610 | A1 | 12/2010 | Wang et al. | |
| 2011/0185739 | A1 | 8/2011 | Bronson et al. | |
| 2011/0314823 | A1 | 12/2011 | Smith et al. | |

* cited by examiner

*Primary Examiner* — Phutthiwat Wongwian
*Assistant Examiner* — William Breazeal
(74) *Attorney, Agent, or Firm* — O'Shea Getz P.C.

(57) ABSTRACT

A turbine engine assembly includes a combustor and a stator vane arrangement having a plurality of stator vanes. The combustor includes a combustor wall that extends axially from a combustor bulkhead to a distal combustor wall end, which is located adjacent to the stator vane arrangement. The combustor wall includes a support shell with a plurality of impingement apertures, and a heat shield with a plurality of effusion apertures. The combustor wall end includes a plurality of circumferentially extending film cooled regions. At least one of the film cooled regions is circumferentially aligned with one of the stator vanes and includes a cooling aperture.

18 Claims, 6 Drawing Sheets

TURBINE ENGINE COMBUSTOR AND STATOR VANE ASSEMBLY

BACKGROUND OF THE INVENTION

1. Technical Field

The present invention relates generally to a turbine engine and, more particularly, to a turbine engine combustor and stator vane assembly.

2. Background Information

A turbine engine can include a compressor section, a combustor and a turbine section, which are sequentially arranged along an axial centerline between a turbine engine inlet and a turbine engine exhaust. The combustor typically includes a forward bulkhead, a radial outer combustor wall and a radial inner combustor wall. The outer and inner combustor walls extend axially from the forward bulkhead to respective distal combustor wall ends, which are connected to the turbine section. Each combustor wall includes a support shell with a plurality of impingement apertures, and a heat shield with a plurality of effusion apertures. The turbine section typically includes a stator vane arrangement located between the combustor wall ends and a forward rotor stage of the turbine section.

During operation, a leading edge of each stator vane in the stator vane arrangement can create a bow wave that causes relatively hot core gas to impinge against the combustor wall ends. The hot core gas can distress exposed ends of the heat shields, exposed ends of the support shells, and/or an exposed portion of a conformal seal that seals a gap between the outer combustor wall and the turbine section. Such distress can significantly reduce the life of the combustor walls.

SUMMARY OF THE DISCLOSURE

According to an aspect of the invention, a turbine engine assembly is provided that includes a combustor and a stator vane arrangement having a plurality of stator vanes. The combustor includes a combustor wall that extends axially from a combustor bulkhead to a distal combustor wall end, which is located adjacent to the stator vane arrangement. The combustor wall includes a support shell with a plurality of impingement apertures, and a heat shield with a plurality of effusion apertures. The combustor wall end includes a plurality of circumferentially extending film cooled regions. At least one of the film cooled regions is circumferentially aligned with one of the stator vanes and includes a cooling aperture.

In some embodiments, each of the film cooled regions is circumferentially aligned with a respective one of the stator vanes and includes a cooling aperture.

In some embodiments, the combustor wall end further includes a plurality of circumferentially extending second regions, and each of the second regions is arranged circumferentially between a respective pair of the film cooled regions. In one embodiment, a first of the film cooled regions has a circumferential first width, and a first of the second regions has a circumferential second width that is greater than the first width. In one embodiment, the second regions are configured as non-film cooled regions. In one embodiment, one or more of the second regions does not include a cooling aperture.

In some embodiments, the heat shield includes a circumferentially extending first rail and a circumferentially extending second rail located at the combustor wall end. An impingement cavity extends radially between the support shell and the heat shield, and axially between the first rail and the second rail. The impingement cavity fluidly couples at least some of the impingement apertures with at least some of the effusion apertures. In one embodiment, the cooling aperture in a first of the film cooled regions extends axially through the second rail, and is fluidly coupled with the impingement cavity.

In some embodiments, the cooling aperture in the first of the film cooled regions is configured as a channel that extends radially into a distal end of the second rail.

In some embodiments, the cooling aperture in the first of the film cooled regions extends radially through the support shell between an aperture inlet and an aperture outlet, which is located axially between the second rail and the stator vane arrangement.

In some embodiments, a conformal seal is included that seals a gap between the combustor wall and the stator vane arrangement. A seal aperture extends radially through the conformal seal and is fluidly coupled to the cooling aperture in the first of the film cooled regions.

In some embodiments, the support shell extends radially between an impingement cavity surface and a seal surface, and axially to a distal support shell end at the combustor wall end. The cooling aperture in the first of the film cooled regions is configured as a channel that extends radially into the seal surface, and axially into the support shell end. In one embodiment, the support shell includes a flange that extends radially from the seal surface to a distal flange end. The channel extends axially into a sidewall of the flange, and the aperture inlet is located at the flange end.

In some embodiments, the heat shield includes a plurality of heat shield panels. In one embodiment, the cooling aperture in a first of the film cooled regions includes a first sub-aperture arranged with a first of the heat shield panels, and a second sub-aperture arranged with a second of the heat shield panels that is adjacent the first of the heat shield panels.

In some embodiments, the cooling aperture in a first of the film cooled regions has a circumferentially elongated and arcuate cross-sectional geometry.

In some embodiments, the cooling aperture in a first of the film cooled regions has a flared geometry.

In some embodiments, the cooling aperture in a first of the film cooled regions is one of a plurality of cooling apertures in the first of the film cooled regions.

In some embodiments, the support shell has an annular cross-sectional geometry, the heat shield has an annular cross-sectional geometry, and the heat shield is disposed radially within the support shell. In other embodiments, the support shell is disposed radially within the heat shield.

In some embodiments, the combustor also includes a second combustor wall that extends axially from the combustor bulkhead to a distal second combustor wall end, which is located adjacent to the stator vane arrangement. The second combustor wall includes a second support shell with a plurality of second impingement apertures, and a second heat shield with a plurality of second effusion apertures. In one embodiment, the second combustor wall end includes a plurality of circumferentially extending second film cooled regions, and each of the second film cooled regions is respectively circumferentially aligned with a respective one of the stator vanes and includes a second cooling aperture.

The foregoing features and the operation of the invention will become more apparent in light of the following description and the accompanying drawings.

DETAILED DESCRIPTION OF THE INVENTION

Figure 1:
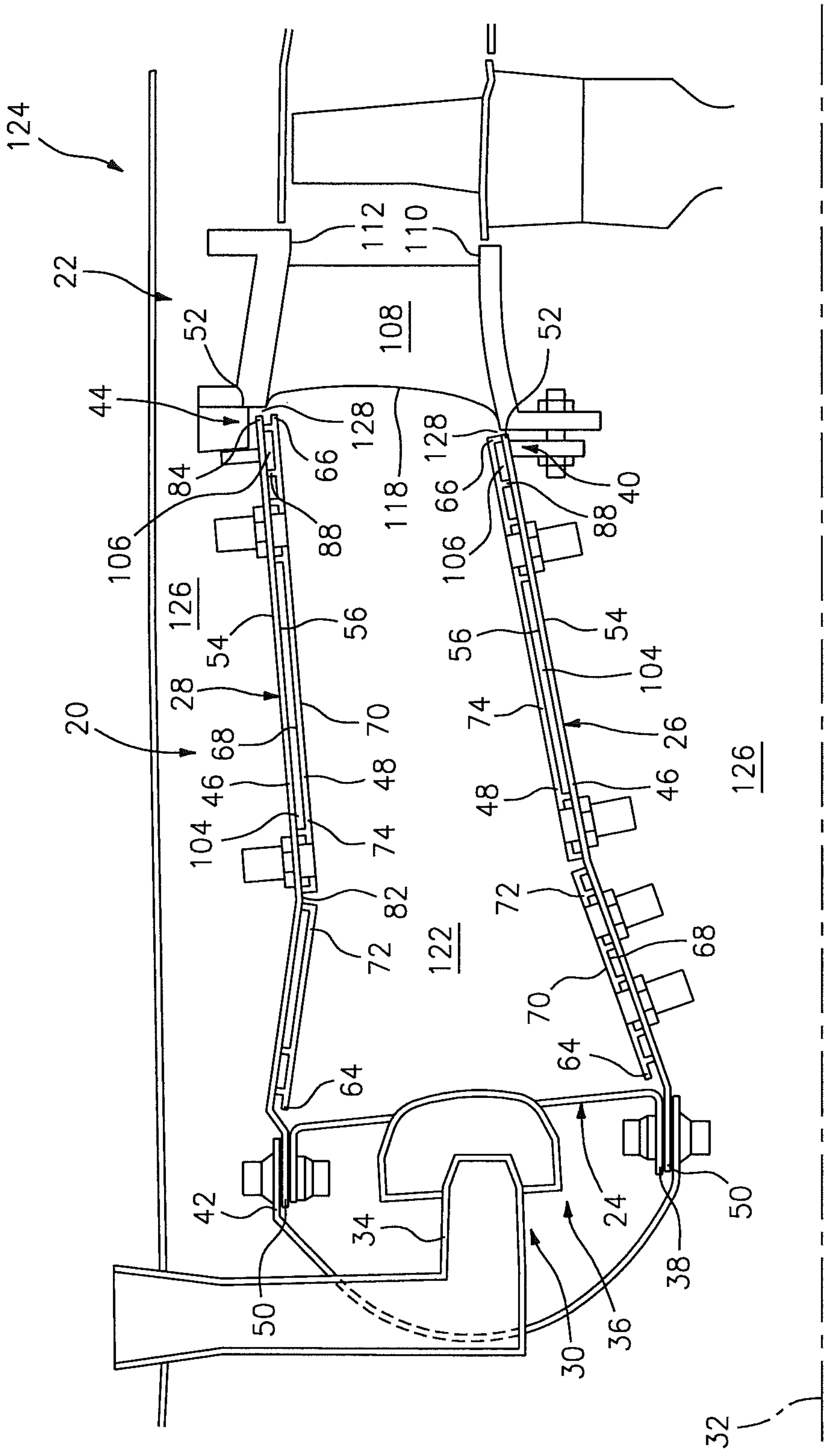
FIG. 1 is a side-sectional illustration of a combustor connected to a turbine stator vane assembly of a turbine engine.
Figure 2:
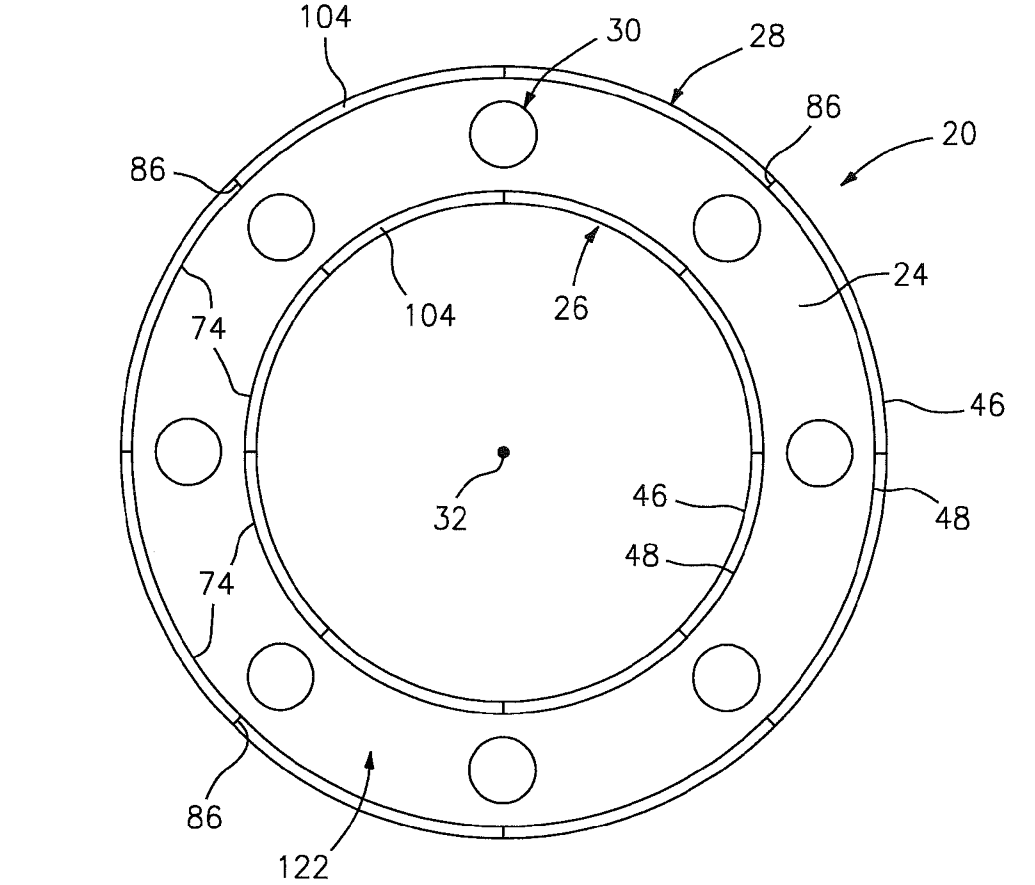
FIG. 2 is a cross-sectional illustration of the combustor of FIG. 1.

FIG. 1 is a side-sectional illustration of a combustor 20 (e.g., an axial flow combustor) connected to a turbine stator vane assembly 22 of a turbine engine. FIG. 2 is a cross-sectional illustration of the combustor 20. Referring to FIGS. 1 and 2, the combustor 20 includes an annular combustor bulkhead 24, a first (e.g., radial inner) combustor wall 26 and a second (e.g., radial outer) combustor wall 28. The combustor 20 also includes a plurality of fuel injector assemblies 30 connected to the bulkhead 24, and arranged circumferentially around an axial centerline 32 of the engine. Each of the fuel injector assemblies 30 includes a fuel injector 34, which can be mated with a swirler 36.

The first combustor wall 26 extends axially from a first (e.g., radial inner) end 38 of the bulkhead 24 to a distal first (e.g., downstream) combustor wall end 40. The second combustor wall 28 extends axially from a second (e.g., radial outer) end 42 of the bulkhead 24 to a distal second (e.g., downstream) combustor wall end 44.

Figure 3:
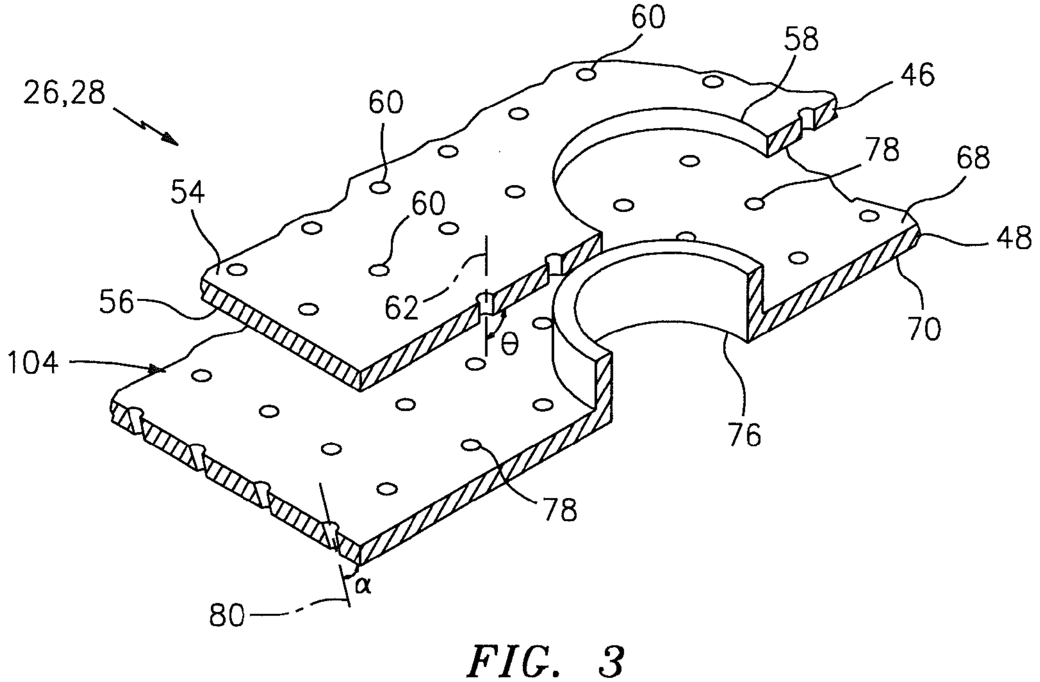
FIG. 3 is an exploded perspective illustration of a section of a combustor wall.

One or both of combustor walls 26 and 28 can include a combustor support shell 46 and a combustor heat shield 48. The support shell 46 extends axially between a first (e.g., upstream) support shell end 50 and a distal second (e.g., downstream) support shell end 52. The first support shell end 50 is connected to the bulkhead 24, and the second support shell end 52 is located at the combustor wall end 40, 44. The support shell 46 extends circumferentially around the axial centerline 32, which provides the support shell 46 with an annular cross-sectional geometry. Referring to FIG. 3, the support shell 46 also extends radially between a combustor plenum surface 54 and a first impingement cavity surface 56. Referring again to FIGS. 1 and 2, the support shell 46 can be constructed as a single integral tubular body. Alternatively, the support shell can be assembled from a plurality of circumferential and/or axial support shell panels.

Referring to FIG. 3, the support shell 46 includes a plurality of shell quench apertures 58 and a plurality of impingement apertures 60. The shell quench apertures 58 extend radially through the support shell 46 between the combustor plenum surface 54 and the first impingement cavity surface 56. The impingement apertures 60 also extend radially through the support shell 46 between the combustor plenum surface 54 and the first impingement cavity surface 56. Each of the impingement apertures 60 has an axis 62 that is angularly offset from the first impingement cavity surface 56, for example, by an angle θ of about ninety degrees. Each of the impingement apertures 60 can have a circular (or non-circular) cross-sectional geometry.

Referring to FIGS. 1 and 2, the heat shield 48 extends axially between a first (e.g., upstream) heat shield end 64 and a distal second (e.g., downstream) heat shield end 66. The first heat shield end 64 is located adjacent the bulkhead 24, and the second heat shield end 66 is located at the combustor wall end 40, 44. The heat shield 48 extends circumferentially around the axial centerline 32, which provides the heat shield 48 with an annular cross-sectional geometry. Referring to FIG. 3, the heat shield 48 also extends radially between a second impingement cavity surface 68 and a combustion chamber surface 70. Referring again to FIGS. 1 and 2, the heat shield 48 can be assembled from a plurality of circumferential and/or axial heat shield panels 72 and 74. Alternatively, the heat shield can be constructed as a single integral tubular body.

Referring to FIG. 3, the heat shield 48 includes a plurality of shield quench apertures 76 and a plurality of effusion apertures 78. The shield quench apertures 76 extend radially through the heat shield 48 between the second impingement cavity surface 68 and the combustion chamber surface 70. The effusion apertures 78 also extend radially through the heat shield 48 between the second impingement cavity surface 68 and the combustion chamber surface 70. Each of the effusion apertures 78 has an axis 80 that is angularly offset from the combustion chamber surface 70, for example, by an angle a of between about ten degrees and about fifty degrees. Each of the effusion apertures 78 can have a circular (or non-circular) cross-sectional geometry.

Figure 4:
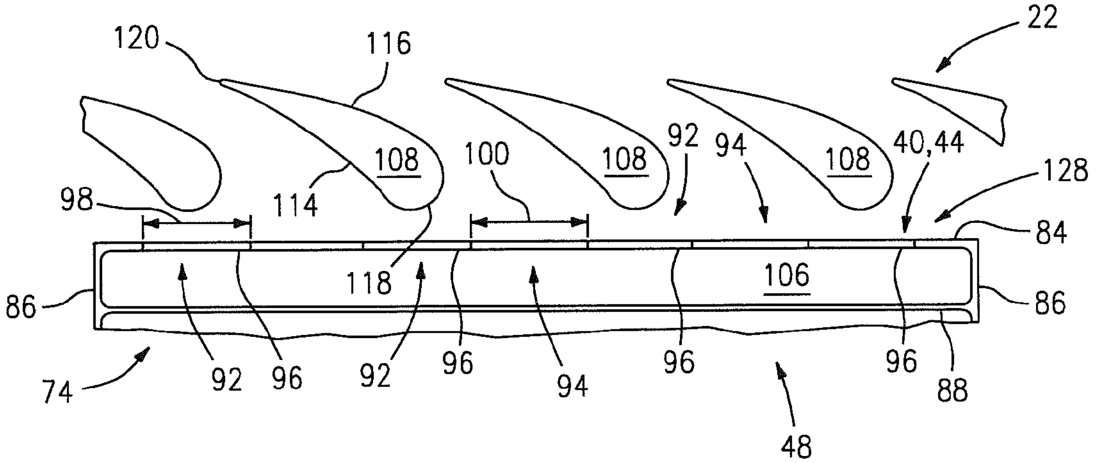
FIG. 4 is a circumferential-sectional illustration of a section of the combustor and the vane assembly of FIG. 1.
Figure 5:
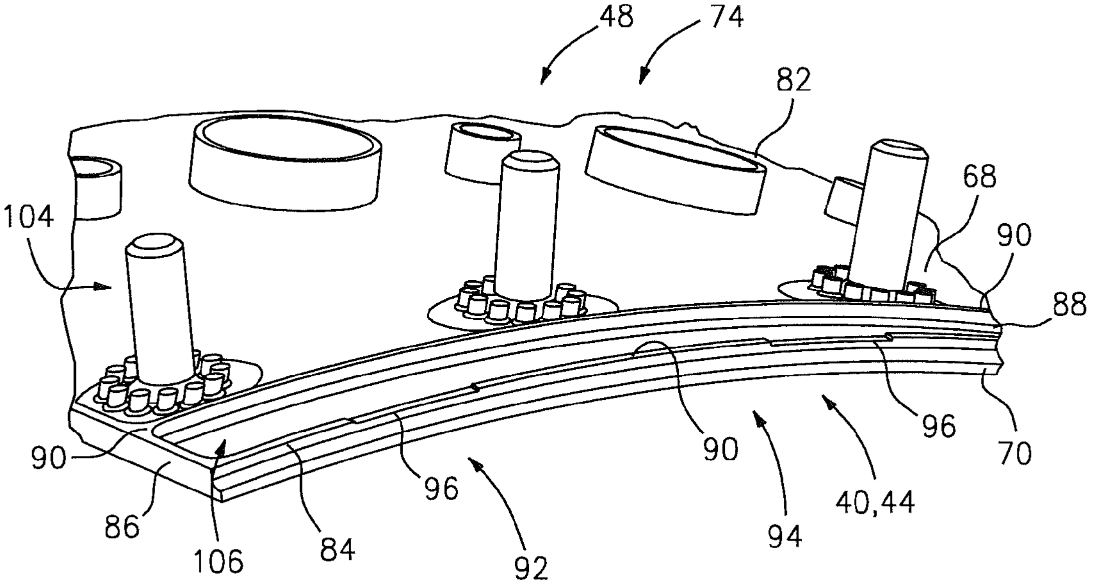
FIG. 5 is a perspective illustration of a section of a combustor heat shield.

Referring to FIGS. 1, 4 and 5, the heat shield 48 can also include a plurality of rails. Each of the aft heat shield panels 74, for example, includes a plurality of (e.g., arcuate) end rails 82 and 84 and a plurality of side rails 86. Each of the aft heat shield panels 74 can also include at least one (e.g., arcuate) intermediate rail 88. The end rails 82 and 84 are respectively located at forward and aft ends of each of the aft heat shield panels 74, and extend circumferentially between the side rails 86. The side rails 86 are located at respective sides of each of the aft heat shield panels 74. The intermediate rail 88 is located axially between the end rails 82 and 84, and extends circumferentially between the side rails 86. Referring to FIG. 5, each of the rails 82, 84, 86 and 88 extends radially from the second impingement cavity surface 68 to a respective distal rail end 90.

Referring to FIGS. 4 and 5, one or both of the combustor wall ends 40 and 44 includes one or more first (e.g., film cooled) end regions 92 and one or more second (e.g., non-film cooled) end regions 94. Each of the first end regions 92 includes and is circumferentially defined by at least one cooling aperture 96 (e.g., a film cooling channel, slot or hole). In the embodiment of FIGS. 4 and 5, for example, each of the first end regions 92 has a first width 98 that extends circumferentially between ends of the respective cooling aperture 96. The cooling aperture 96 extends axially through the end rail 84. The cooling aperture 96 also extends radially into the rail end 90 of the end rail 84. The cooling aperture 96 is illustrated having a circumferentially elongated and arcuate cross-sectional geometry. The present invention, however, is not limited to any particular cooling aperture geometry.

Each of the second end regions 94 has a second width 100 that extends circumferentially between, for example, respective adjacent first end regions 92. In the embodiment of FIGS. 4 and 5, the second width 100 is greater than the first width 98. In other embodiments, however, the second width can be substantially equal to or less than the first width.

Referring to FIGS. 1 and 2, the support shell 46 of the first combustor wall 26 is arranged radially within the heat shield 48 of the first combustor wall 26. The heat shield 48 of the second combustor wall 28 is arranged radially within the support shell 46 of the second combustor wall 28. The heat shields 48 are respectively connected to the support shells 46 with a plurality of fasteners (e.g., heat shield studs and nuts). Referring to FIG. 3, each of the shell quench apertures 58 is fluidly coupled to a respective one of the shield quench apertures 76.

Referring to FIGS. 1 and 2, one or more impingement cavities 104 and 106 are defined between the support shell 46 and the heat shield 48. Referring to FIGS. 1 and 5, for example, a first of the impingement cavities 104 is defined radially between the first and second impingement cavity surfaces 56 and 68. The first impingement cavity 104 is also defined axially between the end and intermediate rails 82 and 88, and circumferentially between the side rails 86. A second of the impingement cavities 106 is defined radially between the first and second impingement cavity surfaces 56 and 68. The second impingement cavity 106 is also defined axially between the intermediate and end rails 88 and 84, and circumferentially between the side rails 86. Referring to FIG. 3, each of the impingement cavities (e.g., the first impingement cavity 104) fluidly couples at least some of the impingement apertures 60 to at least some of the effusion apertures 78. Referring to FIG. 5, at least one of the impingement cavities (e.g., the second impingement cavity 106) is also fluidly coupled to the cooling apertures 96 in a respective one of the heat shield panels 74.

Referring to FIG. 1, the stator vane assembly 22 includes a plurality of (e.g., fixed and/or movable) stator vanes 108 arranged circumferentially around the axial centerline 32. Each of the stator vanes 108 extends radially between a first (e.g., radial inner) platform 110 and a second (e.g., radial outer) platform 112. Referring to FIG. 4, each of the stator vanes 108 includes a concave side surface 114, a convex side surface 116, a leading edge 118 and a trailing edge 120. Each of the stator vanes 108 is circumferentially aligned with a respective one of the first end regions 92 and, thus, a respective one of the cooling apertures 96.

During operation of the combustor 20 of FIGS. 1 and 3, fuel provided by the fuel injectors 34 is mixed with compressed gas within the combustion chamber 122, and the mixture is ignited. The ignited fuel flows axially downstream through the combustion chamber 122 towards the turbine 124, which subjects the combustor walls 26 and 28 and, in particular, the combustion chamber surfaces 70 to relatively high temperatures. To reduce thermal degradation of the combustor walls 26 and 28, the impingement apertures 60 respectively direct cooling air from a cooling air plenum 126 into the impingement cavities 104 and 106. The effusion apertures 78 subsequently direct a portion of the cooling air into the combustion chamber 122 to film cool the combustion chamber surfaces 70.

Referring now to FIGS. 1 and 4, as the ignited fuel flows from the combustion chamber 122 into the stator vane arrangement 22, the leading edges 118 of the stator vanes 108 can create bow waves within the flow. The bow waves can cause a portion of the ignited fuel to flow towards and/or into tolerance gaps 128 between the combustor walls 26 and 28 and the first and second platforms 110 and 112, which can subject the first end regions 92 to relatively high temperatures. To prevent thermal degradation of the first end regions 92, the cooling apertures 96 direct a portion of the cooling air into the gaps 128 to film cool the combustor wall ends 40 and 44 and, in particular, the first end regions 92.

In general, the bow waves have little to no effect on the second end regions 94 because these regions are aligned circumferentially between the stator vanes 108. Thus, the second end regions 94 require little or no film cooling within the gaps 128. In the embodiment of FIGS. 4 and 5, therefore, none of the second end regions 94 include a cooling aperture. The present invention, however, is not limited to any particular second end region configuration.

Figure 6:
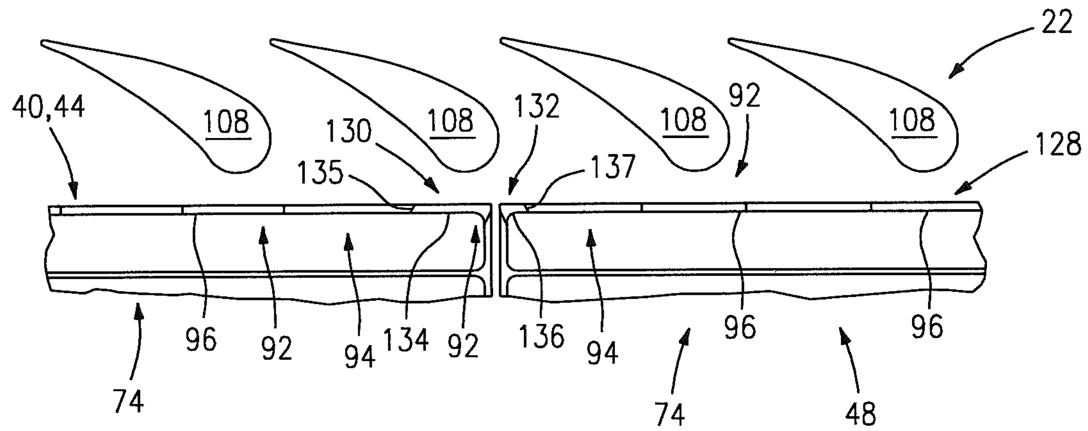
FIG. 6 is a circumferential-sectional illustration of a section of an alternative embodiment combustor and turbine stator vane assembly.

Referring to FIG. 6, in some embodiments, one or more of the first end regions 92 may circumferentially overlap adjacent heat shield panels 74. For example, an overlapping one of the first end regions 92 can include a first end sub-region 130 located with a first of the adjacent heat shield panels 74, and a second end sub-region 132 located with a second of the adjacent heat shield panels 74. The first end sub-region 130 includes a first sub-aperture 134, and the second end sub-region 132 includes a second sub-aperture 136. In this embodiment, the overlapping first end region 92 extends circumferentially between the circumferentially outermost ends 135 and 137 of the first and second sub-apertures 134 and 136.

Figure 7:
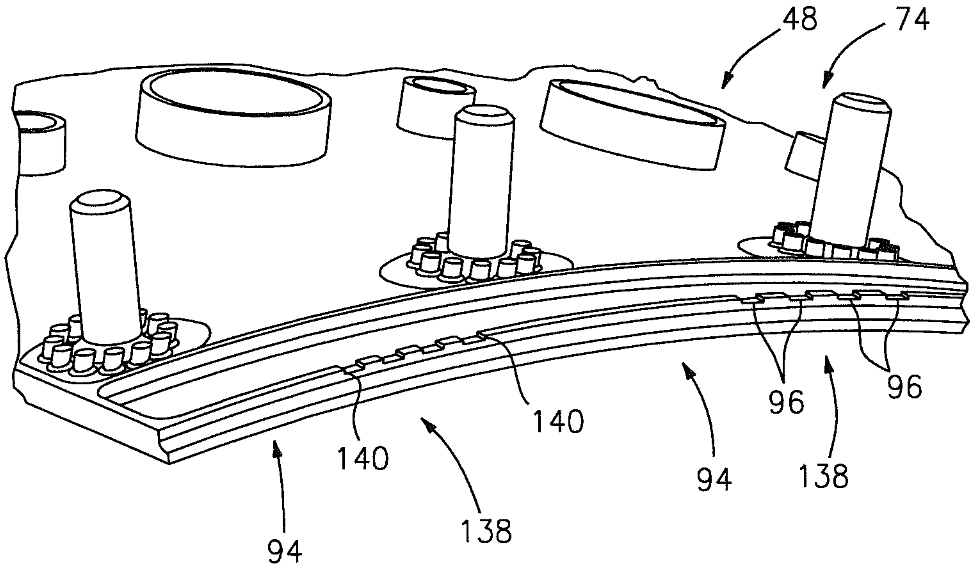
FIG. 7 is a perspective illustration of a section of an alternative embodiment combustor heat shield.

FIG. 7 illustrates the heat shield 48 with alternative embodiment first end regions 138. In contrast to the first end regions 92 of FIG. 5, each of the first end regions 138 includes a group of a plurality of the cooling apertures 96. In this embodiment, each of the first end regions 138 extends circumferentially between the circumferentially outermost ends 140 of the circumferentially outermost cooling apertures 96 within the respective group.

Figure 8:
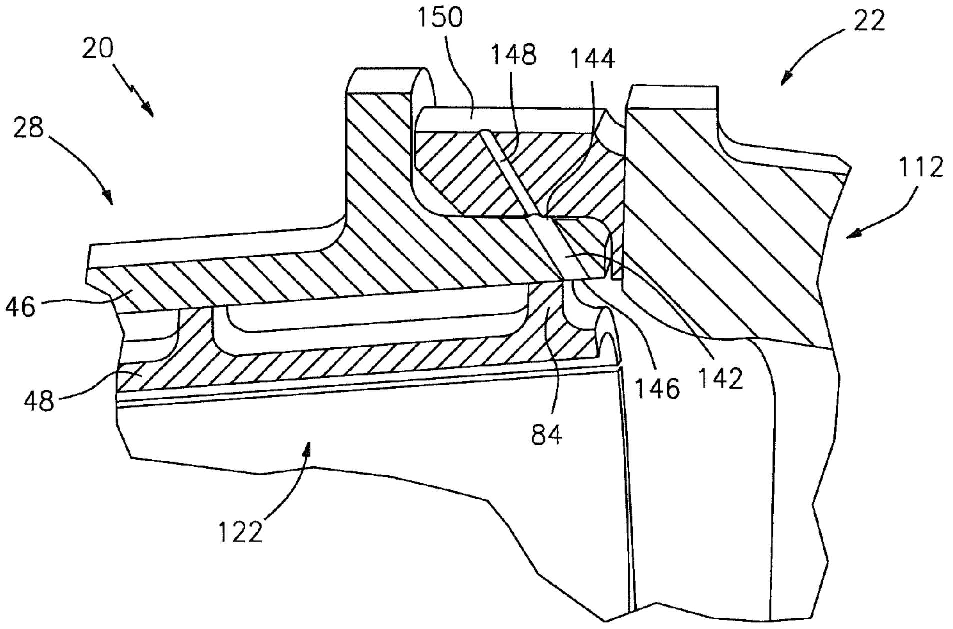
FIG. 8 is a perspective illustration of a section of another alternative embodiment combustor and turbine stator vane assembly.

FIG. 8 illustrates the combustor wall 28 with alternate embodiment cooling apertures 142 (e.g., cooling slots). In contrast to the cooling apertures 96 illustrated in FIGS. 4 to 7, each of the cooling apertures 142 extends radially through the support shell 46 from an aperture inlet 144 to an aperture outlet 146. The aperture outlet 146 is located axially between the end rail 84 and the stator vane arrangement 22. In the specific embodiment of FIG. 8, each of the cooling apertures 142 is fluidly connected to a respective seal aperture 148. Each of the seal apertures 148 extends radially through an annular conformal seal 150, which seals a gap between, for example, the support shell 46 and the second platform 112.

Figure 9:
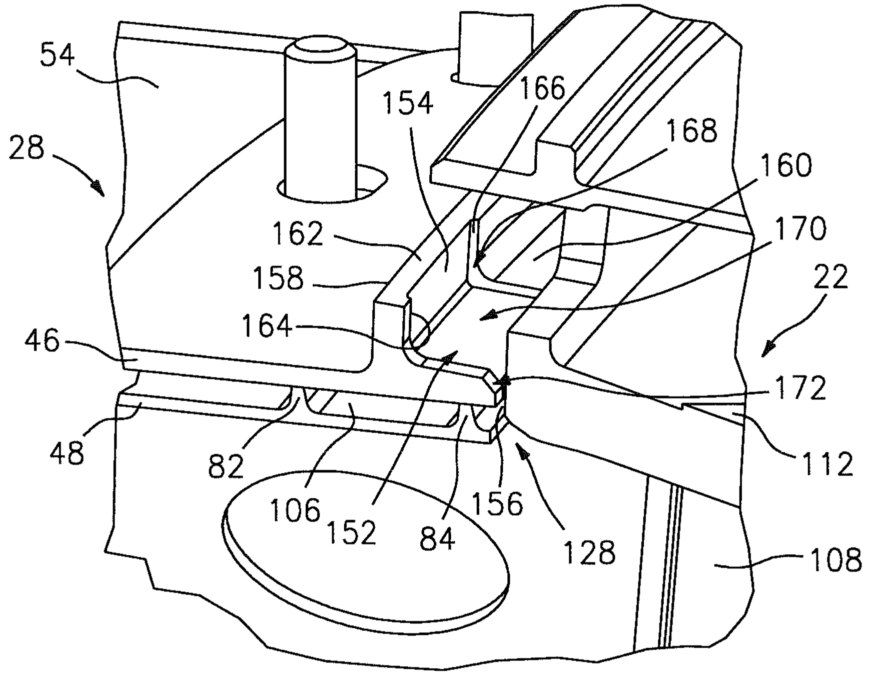
FIGS. 9 and 10 are perspective illustrations of a section of still another alternative embodiment combustor and turbine stator vane assembly.
Figure 10:
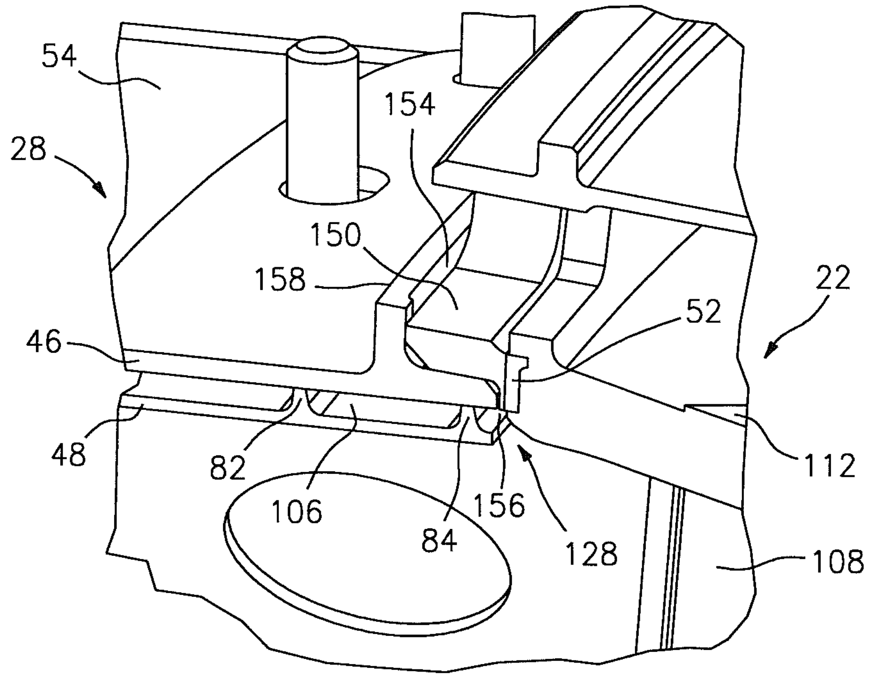

FIGS. 9 and 10 illustrate the combustor wall 28 with alternative embodiment cooling apertures 152 (e.g., cooling channels). In contrast to the cooling apertures 96 illustrated in FIGS. 4 to 7, each of the cooling apertures 152 extends radially through the support shell 46 from an aperture inlet 154 to an aperture outlet 156. In the specific embodiment of FIGS. 9 and 10, for example, the support shell 46 includes an annular flange 158 located axially between the combustor plenum surface 54 and a seal surface 160 that engages the conformal seal 150. The flange 158 extends radially from the combustor plenum surface 54 and the seal surface 160 to a distal flange end 162, and axially between opposing sidewalls 164 and 166. Each of the aperture inlets 154 is located at the flange end 162, and each of the aperture outlets 156 is located adjacent the gap 128 and axially between the end rail 84 and the stator vane arrangement 22. Each of the cooling apertures 152 includes a plurality of aperture segments 168, 170 and 172. The first aperture segment 168 extends radially between the aperture inlet 154 and the second aperture segment 170, and axially into the al sidewall 166 of the flange 158. The second aperture segment 170 extends axially from the first aperture segment 168 to the third aperture segment 172, and radially into the seal surface 160. The third aperture segment 172 extends radially from the second aperture segment 170 to the aperture outlet 156, and extends axially into the support shell end 52.

A person of skill in the art will recognize that the cooling apertures can be configured with various cross-sectional geometries and/or configurations other than those described above and illustrated in the drawings. In some embodiments, for example, one or more of the cooling apertures may have a flared and/or tapered geometry. In some embodiments, one or more of the cooling apertures may have multi-faceted cross-sectional geometries. The present invention therefore is not limited to any particular cooling aperture cross-sectional geometry and/or configuration.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A turbine engine assembly, comprising:

a stator vane arrangement including a plurality of stator vanes; and a combustor including a combustor wall extending axially from a combustor bulkhead to a distal combustor wall end that is located adjacent to the stator vane arrangement;

wherein the combustor wall includes a support shell with a plurality of impingement apertures, and a heat shield with a plurality of effusion apertures;

wherein the combustor wall end includes a plurality of circumferentially extending film cooled regions, and at least one of the film cooled regions is circumferentially aligned with one of the stator vanes and includes a cooling aperture;

wherein the heat shield includes a circumferentially extending first rail and a circumferentially extending second rail located at the combustor wall end;

wherein an impingement cavity extends radially between the support shell and the heat shield, and axially between the first rail and the second rail, and the impingement cavity fluidly couples at least some of the impingement apertures with at least some of the effusion apertures; and wherein the cooling aperture in a first of the film cooled regions extends axially through the second rail, and is fluidly coupled with the impingement cavity.

2. The engine assembly of claim 1, wherein each of the film cooled regions is circumferentially aligned with a respective one of the stator vanes and includes a cooling aperture.

3. The engine assembly of claim 1, wherein a first of the film cooled regions has a circumferential first width; and the combustor wall end further includes a plurality of circumferentially extending second regions, and each of the second regions is arranged circumferentially between a respective pair of the film cooled regions and has a circumferential second width that is greater than the first width.

4. The engine assembly of claim 1, wherein the combustor wall end further includes a plurality of circumferentially extending non-film cooled regions, and each of the non-film cooled regions is arranged circumferentially between a respective pair of the film cooled regions.

5. The engine assembly of claim 1, wherein the combustor wall end further includes a plurality of circumferentially extending second regions, and each of the second regions is arranged circumferentially between a respective pair of the film cooled regions, and does not include a cooling aperture.

6. The engine assembly of claim 1, wherein the cooling aperture in the first of the film cooled regions comprises a channel that extends radially into a distal end of the second rail.

7. The engine assembly of claim 1, wherein the cooling aperture in the first of the film cooled regions extends radially through the support shell between an aperture inlet and an aperture outlet located axially between the second rail and the stator vane arrangement.

8. The engine assembly of claim 7, further comprising a conformal seal that seals a gap between the combustor wall and the stator vane arrangement, wherein a seal aperture extends radially through the conformal seal and is fluidly coupled to the cooling aperture in the first of the film cooled regions.

9. The engine assembly of claim 1, wherein the heat shield includes a plurality of heat shield panels.

10. The engine assembly of claim 9, wherein the cooling aperture in the first of the film cooled regions includes a first sub-aperture arranged with a first of the heat shield panels, and a second sub-aperture arranged with a second of the heat shield panels that is adjacent the first of the heat shield panels.

11. The engine assembly of claim 1, wherein the cooling aperture in the first of the film cooled regions has a circumferentially elongated and arcuate cross-sectional geometry.

12. The engine assembly of claim 1, wherein the cooling aperture in a first of the film cooled regions has a flared geometry.

13. The engine assembly of claim 1, wherein the cooling aperture in the first of the film cooled regions is one of a plurality of cooling apertures in the first of the film cooled regions.

14. The engine assembly of claim 1, wherein the support shell has an annular cross-sectional geometry, the heat shield has an annular cross-sectional geometry, and the heat shield is disposed radially within the support shell.

15. The engine assembly of claim 1, wherein the combustor further includes a second combustor wall that extends axially from the combustor bulkhead to a distal second combustor wall end that is located adjacent to the stator vane arrangement, and the second combustor wall includes a second support shell with a plurality of second impingement apertures, and a second heat shield with a plurality of second effusion apertures.

16. The engine assembly of claim 15, wherein the second combustor wall end includes a plurality of circumferentially extending second film cooled regions, and each of the second film cooled regions is respectively circumferentially aligned with a respective one of the stator vanes and includes a second cooling aperture.

17. A turbine engine assembly, comprising:

a stator vane arrangement including a plurality of stator vanes; and a combustor including a combustor wall extending axially from a combustor bulkhead to a distal combustor wall end that is located adjacent to the stator vane arrangement;

wherein the combustor wall includes a support shell with a plurality of impingement apertures, and a heat shield with a plurality of effusion apertures;

wherein the combustor wall end includes a plurality of circumferentially extending film cooled regions, and at least one of the film cooled regions is circumferentially aligned with one of the stator vanes and includes a cooling aperture;

wherein the heat shield includes a circumferentially extending first rail and a circumferentially extending second rail located at the combustor wall end;

wherein an impingement cavity extends radially between the support shell and the heat shield, and axially between the first rail and the second rail, and the impingement cavity fluidly couples at least some of the impingement apertures with at least some of the effusion apertures;

wherein the cooling aperture in a first of the film cooled regions extends radially through the support shell between an aperture inlet and an aperture outlet located axially between the second rail and the stator vane arrangement;

wherein the support shell extends radially between an impingement cavity surface and a seal surface, and axially to a distal support shell end at the combustor wall end; and wherein the cooling aperture in the first of the film cooled regions comprises a channel that extends radially into the seal surface, and axially into the support shell end.

18. The engine assembly of claim 17, wherein the support shell includes a flange that extends radially from the seal surface to a distal flange end; and the channel extends axially into a sidewall of the flange, and the aperture inlet is located at the flange end.

* * * * *